Oct. 23, 1951     M. SMITH ET AL     2,572,774

MEANS FOR SUPPORTING AND LOCKING REMOVABLE PANELS

Filed July 28, 1948     2 SHEETS—SHEET 1

INVENTOR.
MERTON SMITH and
FRANK A. LESKOVEC

BY Bake Teare & McBean
ATTORNEYS

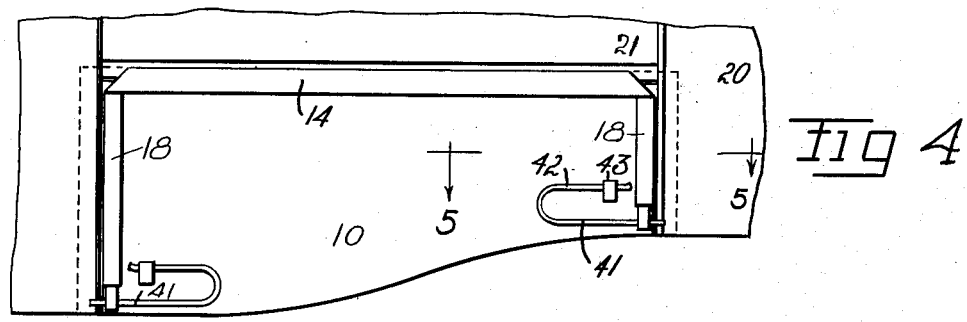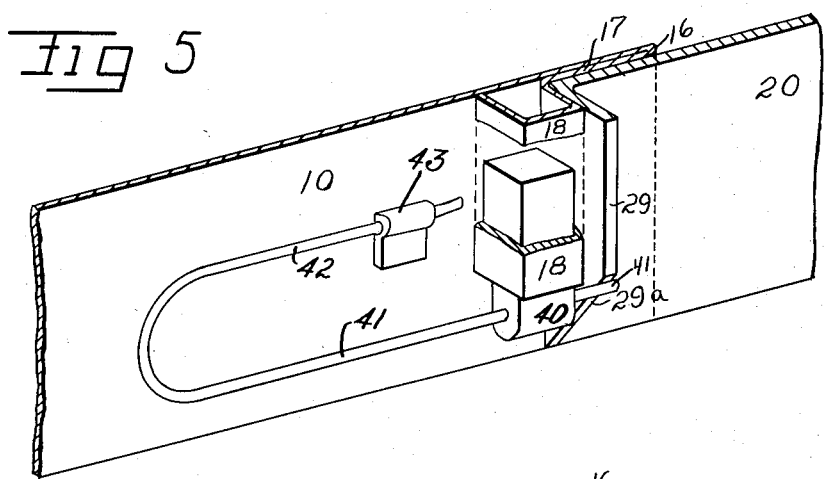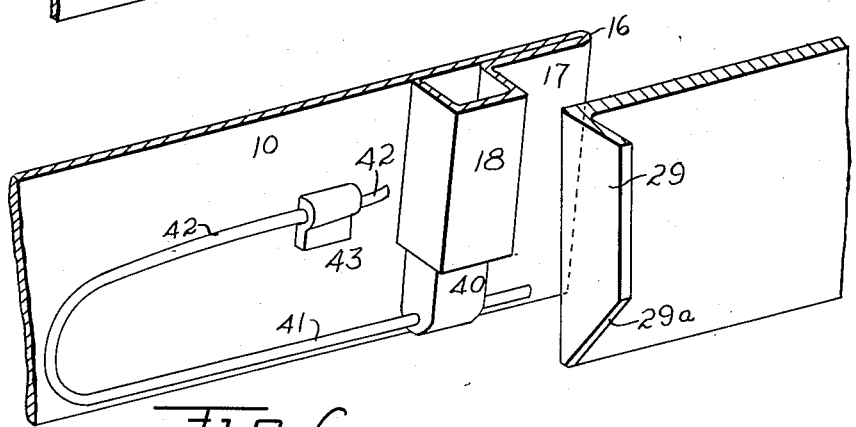

Patented Oct. 23, 1951

2,572,774

UNITED STATES PATENT OFFICE 2,572,774

MEANS FOR SUPPORTING AND LOCKING REMOVABLE PANELS

Merton Smith, Cleveland, and Frank A. Leskovec, Geneva, Ohio, assignors, by mesne assignments, to McCabe-Powers Auto Body Co., St. Louis, Mo., a corporation of Missouri Application July 28, 1948, Serial No. 41,074

3 Claims. (Cl. 280—153)

1

This invention is concerned with means for holding in place a removable panel covering an opening in some wall or externally exposed surface. Our invention provides means carried by a removable panel on its inner side, and hidden from view when the panel is in place, to cooperate with hidden means adjacent the margin of the opening to be covered, for supporting and locking the panel in its active position, while allowing its ready removal whenever desired.

An illustration of the use of the invention is on a wheel housing of the body of a utility truck, and in such installation the panel overlaps the outer face of the housing wall and normally retains its position over the opening, but whenever desired is readily removable to allow complete access to the wheel. An object of the invention is to provide such removable panel and such cooperating means on the member having the opening to be covered, as will enable the ready mounting of the panel tightly on the member in a manner which will not work loose from subsequent vibrations, as when the vehicle travels, while the panel is readily removable whenever desired.

To this end, we have provided an inwardly projecting stationary ledge within the member having the opening and above the top of the opening, and we have provided the panel adjacent its top with an inwardly offset portion carrying an outwardly projecting ledge adapted to rest on the ledge of the member. This enables the upward portion of the panel to be passed upward diagonally through the opening to bring the panel ledge behind and above the stationary ledge, whereupon the mere inward swing of the lower edge of the panel will bring its ledge over the stationary ledge, in which position the panel will become supported. At the same time, we provide locking means for the lower portion of the panel which effectively locks it to the wall.

Our invention includes the panel supporting and locking means above outlined, and also the more detailed construction thereof hereinafter fully explained in connection with the drawings, which illustrate a preferred embodiment.

Figure 1:
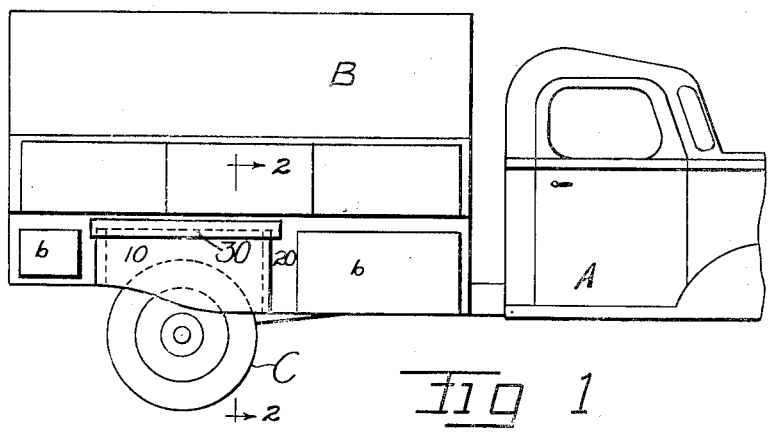
Figures 2, 3:
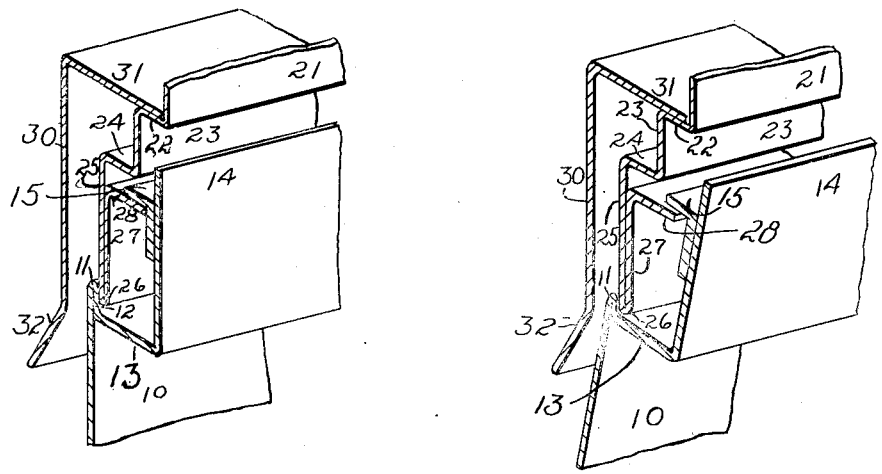

In the drawings, Fig. 1 is a side elevation of a motor vehicle of the utility truck type having a body equipped with our removable side panel; Fig. 2 is the detail illustrating the coacting ledges of the body and panel, being a vertical section continued as a perspective in a position indicated, for instance, by the line 2—2 on Fig. 1; Fig. 3 is a view similar to Fig. 2, but showing the position of the panel in the act of being inserted into its supported position; Fig. 4 is an elevation looking outwardly from the inside of the panel and showing it in its locked position; Fig. 5 is a perspective looking outwardly from behind the panel and showing the lock in its engaging position, the upper edge of this view being a substantially

2 horizontal section through the panel and adjacent portion of the body, as indicated by the line 5—5 of Fig. 4; Fig. 6 is a perspective similar to Fig. 5, showing the lower end of the panel in the act of being swung into a locked position.

In Fig. 1, A indicates a suitable vehicle carrying a body B which overhangs the rear wheels of the vehicle, one of which is shown at C. The body has a substantially vertical external wall and is indicated as having compartments for tools, normally closed at their outer faces by doors b. Adjacent the upper portion of the wheel C the body wall B is formed with an opening of considerable size, which is normally covered by the panel 10 of this invention. The wall 20 of the body has a longitudinal frame member 21 (Figs. 2, 3 and 4) which extends over the opening of the wheel housing, and with which the panel coacts as hereinafter explained.

The frame member 21 is illustrated in Figs. 2 and 3, as having a vertical portion 20, then an outwardly extending portion 22, then a downwardly extending portion 23, which continues outwardly at 24 and then downwardly at 25, forming in this region a portion of the outer wall of the body. At the lower end of the portion 25 the member is formed with a return bend 26 and then continuous upwardly at 27 and finally inwardly at 28. The return bend 26 defines the top of the opening to the wheel housing, and the portion 28 of this frame member provides the ledge heretofore mentioned to support the panel.

The panel 10 is a sheet metal member formed at the top of its external portion with a return bend 11 providing a downwardly extending reinforcing region 12 from which the panel extends inwardly at 13, preferably at a right angle to its main portion, thence upwardly at 14. To the outer face of the portion 14 of the panel we secure, preferably by welding, an angle bar having an outwardly projecting portion 15. This portion 15 constitutes the panel edge heretofore mentioned which may be caused to overhang and rest on the body ledge 28.

When the panel is being put in position its upper portion is passed through the wall opening and moved diagonally upward so that the rib provided by a double portion 11 and 12 comes against the outer face of the body wall, just above the body return bend 26 defining the top of the opening, as shown in Fig. 3. In this position the panel ledge 15 lies behind the body ledge and slightly higher than such ledge. Then when the panel is swung into vertical position, as shown in Fig. 2, the ledge 15 slides across the top of the body ledge 28 and effectively supports the panel. At its end margin the panel overhangs the housing opening, thus making an abutting engagement with the body wall at both vertical edges of the panel.

To prevent leakage from weather conditions into the space behind the top edge 11 of the panel, we provide a shield 30 which is a rigid part of the body and extends downwardly to overhang the top portion of the panel while leaving a sufficient space for the swinging of the panel to or from the closed position. This shield 30 is shown as a plate having an inwardly extending top portion 31, which rests on the body frame portion 22 and is preferably welded thereto. The downwardly extending portion of the shield is spaced from the body frame member 25 and preferably adjacent its lower end is inclined outwardly, as shown at 32 forming a draining portion and increasing the space behind the shield. At its longitudinal ends the shield is snugly connected with the body wall so that the space between the wall proper and shield comprises a pocket entirely closed except at the bottom entrance.

As heretofore mentioned, we provide means for locking the lower portion of the panel snugly to the body wall while enabling its disconnection whenever desired. This means is illustrated in Figs. 4, 5, and 6. As there shown the body wall 20 has an inwardly projecting flange 29 defining the end of the wheel housing opening. The panel 10 overhangs this opening at each end and then by a return bend at 16 has a reinforcing portion 17 lying against the inner face of the panel. At its inner edge this portion 17 is bent first away from the panel and then parallel with the panel and finally back to the inner face of the panel to form a vertical tubular housing 18.

Slidably occupying the housing 18 is a block 40 through which extends the free end portion of a U-shaped resilient rod 41. The upper end portion 42 of this rod is anchored to the panel by a suitable clip 43 welded to the panel. The action of the U-shaped spring tends to elevate the block 40 in the housing 18.

The lower edge of the body flange 29 is cut off diagonally, as shown at 29a in Figs. 5 and 6. When the panel is in its closed position the free end of the rod 41 extends behind and engages this inclined face of the body flange. This effectively locks the panel in that region to the body wall and maintains a tight connection at all times, notwithstanding vibrations resulting from the travel of the vehicle.

It is to be understood that the construction of the housing 18, block 40 and wire springs, shown in Figs. 5 and 6, is duplicated at the other end of the panel, as indicated in Fig. 4. As the two housings 18 for the bolts 40 stand close to the exposed face of the body flange 29 when the panel is in place, such housings serve also to prevent any longitudinal movement of the closed panel.

It will be understood from the above description, that when the panel is in place it overlaps the body opening at the top and at the two vertical ends of the opening, and maintains a snug connection therewith throughout those margins, and by reason of the constantly acting spring action of the two rods 41 against the body inclines 29a there is no chance for even a rattling of the panel during the travel of the vehicle.

When it is desired to remove the panel, it is only necessary for the operator to reach beneath the panel and grasp the rods 41 and pull them downwardly to cause the extreme ends of the rods to clear the lower end of the flanges 29, then the panel is free to be swung outwardly at its lower end, as indicated in Fig. 6. This outward swinging gradually frees the panel ledge 15 from the supporting ledge 28, as indicated in Fig. 3; whereupon the panel becomes disconnected at all points and may be readily removed.

It will be seen that we have provided a removable panel to cover a body opening with means hidden from view for snugly holding it with its margins against the body wall. The locking means provided may remain in locked position as long as desired, but whenever it is necessary to remove the panel, as, for instance, when a tire is to be changed, the panel may be readily released and thereafter as readily restored.

We claim:

1. The combination of a wall having an opening to be covered and having an inwardly projecting supporting member above the opening, a panel adapted to cover the opening at its top and ends, said panel having an outwardly projecting supporting member held by the panel above and behind the top thereof and adapted to overhang the body member, said panel carrying adjacent its ends inwardly projecting members adapted to coact with the end of the wall opening to limit the longitudinal movement of the panel, and means for locking the two lower corners of the panel to the body wall, said means including projecting members spring-pressed upwardly, the body having upwardly inclined abutments adjacent the ends of the opening adapted to be engaged by said projecting members.

2. The combination of a body having a wall with an opening to be covered and a panel adapted to cover the opening and overlap its end margins, said panel carrying on its inner side adjacent its top means adapted to coact with a supporting member on the body, said panel carrying adjacent its ends inwardly projecting housings adapted to coact with the end of the wall opening to limit the longitudinal movement of the panel and means for locking the two lower corners of the panel to the body wall, said means including blocks slidably mounted in the housings and longitudinally projecting means connected thereto and spring-pressed upwardly, the body having inclined abutments adjacent the ends of the opening adapted to be engaged by said projecting means.

3. The combination of a body having a wall with an opening to be covered, a panel adapted to cover the opening and overlap the ends thereof, a U-shaped spring having one of its arms anchored to the inner face of the panel and the other arm adapted to project, said body having at the ends of its opening an abutment inclined on its inner edge, the projecting portion of the spring adapted to engage such inclined edge when the panel is vertical that it may maintain a tight engagement between the overhanging portion of the panel and the wall.

MERTON SMITH.
FRANK A. LESKOVEC.

REFERENCES CITED

The following references are of record in the file of this patent:

UNITED STATES PATENTS

| Number | Name | Date |
|---|---|---|
| Re. 20,857 | Haltenberger | Sept. 13, 1938 |
| D. 148,831 | Wagner | Feb. 24, 1948 |
| 695,267 | Beach | Mar. 11, 1902 |
| 1,044,670 | Liberty et al. | Nov. 19, 1912 |
| 2,139,901 | Lyon | Dec. 13, 1938 |
| 2,157,921 | Schatzman | May 9, 1939 |
| 2,267,421 | Purdy | Dec. 23, 1941 |